Figure 1A:
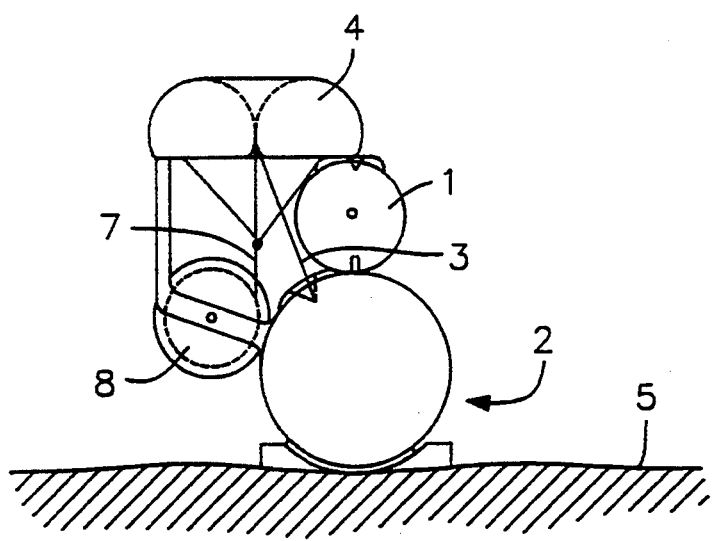

United States Patent [19]
Almström et al.

[11] Patent Number: 5,377,164
[45] Date of Patent: Dec. 27, 1994

[54] METHOD TO OPERATE WITH A WIRE-GUIDED, IN AIR OR WATER, MOVABLE VEHICLE AND A DEVICE FOR CARRYING OUT THE METHOD

[75] Inventors: Henrik Almström, Västerhaninge; Paul Ström, Sollentuna; Lars Lekzén, Stockholm, all of Sweden

[73] Assignee: Försvarets Forskningsanstalt, Sundbyberg, Sweden

[21] Appl. No.: 39,323

[22] PCT Filed: Aug. 23, 1991

[86] PCT No.: PCT/SE91700560
§ 371 Date: Apr. 23, 1993
§ 102(e) Date: Apr. 23, 1993

[87] PCT Pub. No.: WO92/04590
PCT Pub. Date: Mar. 19, 1992

[30] Foreign Application Priority Data
Aug. 29, 1990 [SE] Sweden .................... 9002760

[51] Int. Cl.⁵ .................. H04B 11/00; F42B 15/04
[52] U.S. Cl. ................... 367/131; 244/3.12
[58] Field of Search ............ 367/131, 4, 134; 244/3.12; 114/21.1, 21.2, 326, 328, 330; 102/411, 412, 413

[56] References Cited
U.S. PATENT DOCUMENTS

| | | | |
|---|---|---|---|
| 2,422,337 | 6/1947 | Chilowsky | 367/4 |
| 3,161,168 | 12/1964 | Rebikoff | 114/21.1 |
| 4,004,265 | 1/1977 | Woodruff et al. | 367/4 |
| 4,557,697 | 12/1985 | Kontar et al. | 441/2 |
| 4,794,575 | 12/1988 | Miller | 367/4 |

Primary Examiner—Daniel T. Pihulic
Attorney, Agent, or Firm—Jacobbson, Price, Holman & Stern

[57] ABSTRACT

One embodiment that is shown relates to a reconnaissance and/or weapons system for underwater use and comprises a vehicle 1, which may be a torpedo, and a support 2. The support is connected with torpedo 1 with a control wire 3. The wire has a density lower than that of water and will therefore float. The control wire is stored in a magazine and supported by buoyant means 4.

10 Claims, 6 Drawing Sheets

METHOD TO OPERATE WITH A WIRE-GUIDED, IN AIR OR WATER, MOVABLE VEHICLE AND A DEVICE FOR CARRYING OUT THE METHOD

The present invention relates to a method to operate with a wire-guided, in air or water, movable vehicle and a device for carrying out the method. The invention has emerged when starting from problems concerning underwater vehicles or put in another way, torpedoes and will therefore mainly be exemplified with such. The present problem exist, however, also in an application with air vehicles and also in this case it can be solved in the same way, so the invention relates also to such vehicles.

In order to stop foreign underwater vehicles from operating in the Swedish archipelago, it is necessary to be able to continuously guard important entrances to inner water and provide a serious threat to damage an intruding submarine, if it tries to penetrate. It is also necessary to effectively close the inner water, if a submarine has penetrated and establish a serious threat to this submarine if it tries to break out. A system that shall cope with this task should among other things be transportable and possess a great endurance and have a high probability of hit and effect. Due to a difficult bottom topography and a difficult hydroacoustical environment in our inner archipelagoes, it is necessary, when using an active hydroacoustical homing device, that target data are transmitted to an operator, who makes the classification of hydrophone echoes.

A possible solution to the raised problem is to use some form of a wire-guided torpedo-mine, that is a wire guided torpedo that rests on a support on the bottom until it is activated, whereupon it swims away on its commission. It is in this case possible to have an operator on the shore, connected to the support with a cable, for example an optical fibre, for communication and possibly also an usual two-wire cable for power supply.

Between the support and the torpedo, or more generally put, the vehicle, in a corresponding way, a wire is running for the transmission of information, that is guidance information for the torpedo and, in the reconnaissance case, reconnaissance results from the torpedo. This far the present system are previously known, at least as ideas, but here a serious problem arises in Swedish waters. The bottoms are here, along great parts of the coast, rocky and stony and therefore there is a great risk that the wire between the vehicle and the support gets caught somewhere and gets broken. This serious problem is solved by the invention by giving it the design that is evident from the independent claims.

Corresponding problems exist for wire guided air or atmosphere vehicles, for instance remotely controlled reconnaissance helicopters or remotely controlled propelled airships. The wire can easily get caught in trees or the like in the vicinity of the vehicle support. Also this problem is solved by the invention in a corresponding way.

Figure 1B:
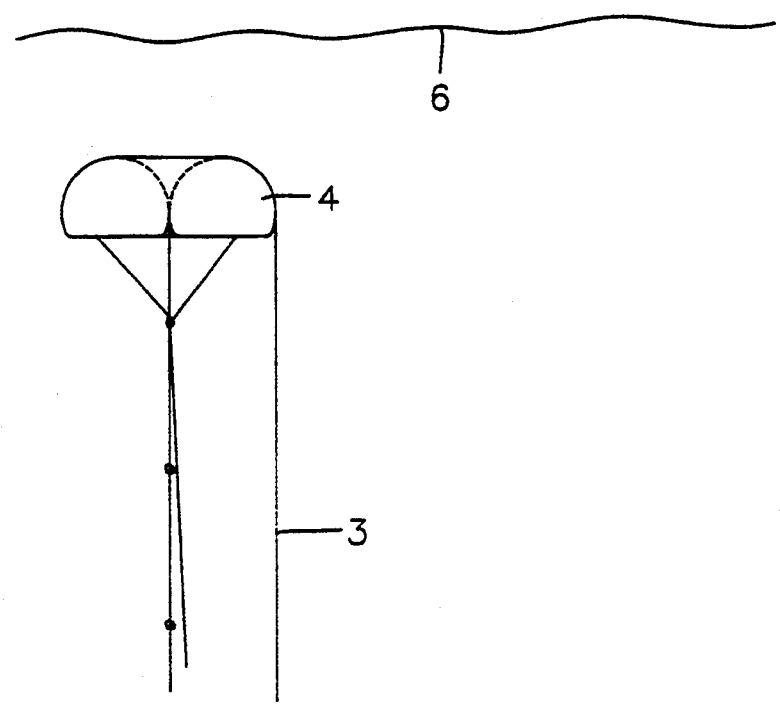
Figure 1B:
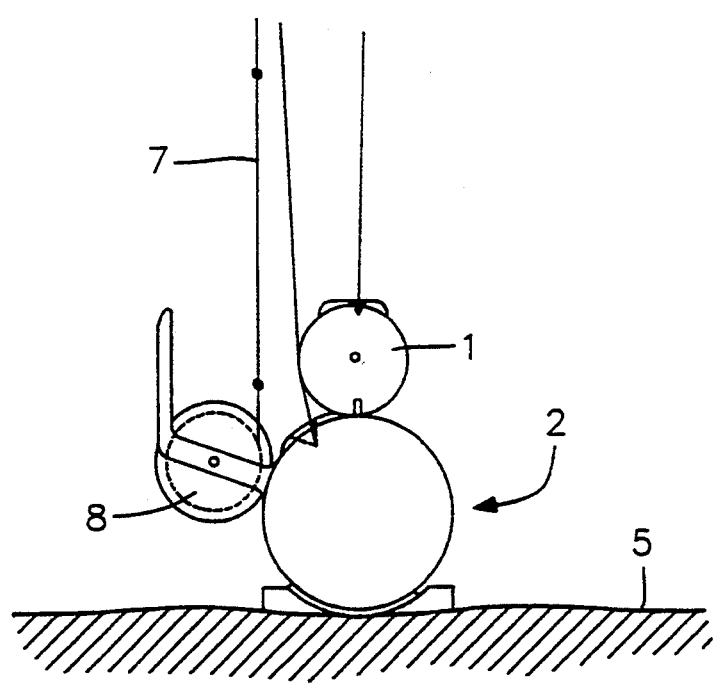
Figure 1C:
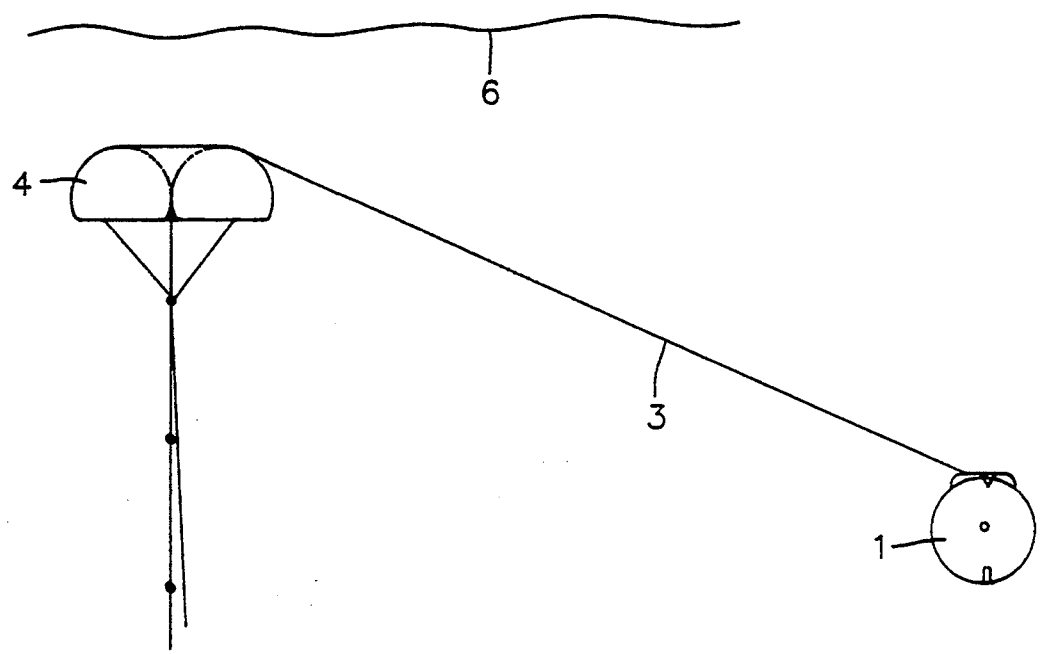
Figure 1C:
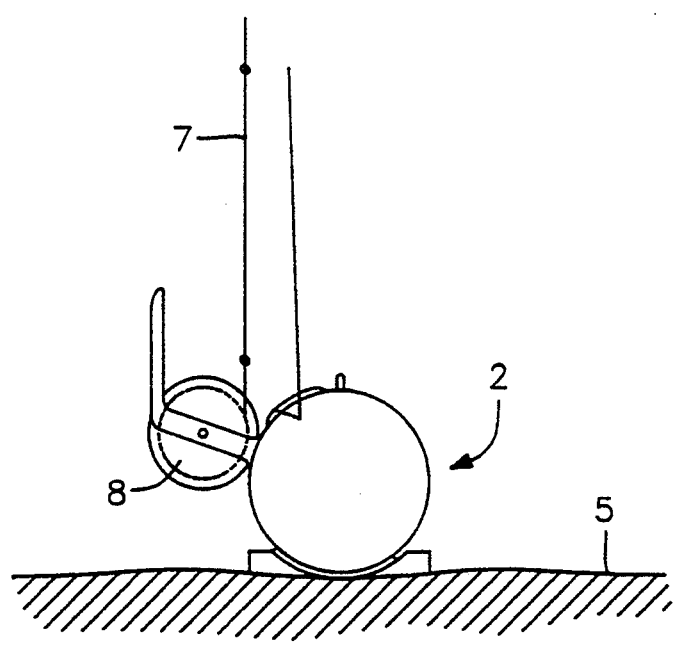
Figure 2A:
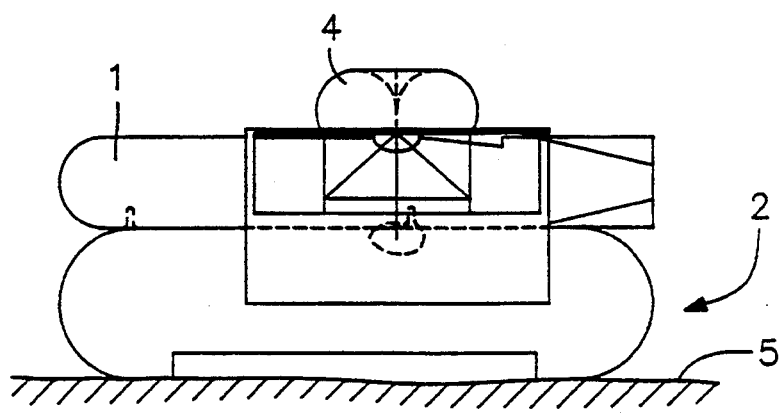
Figure 3:
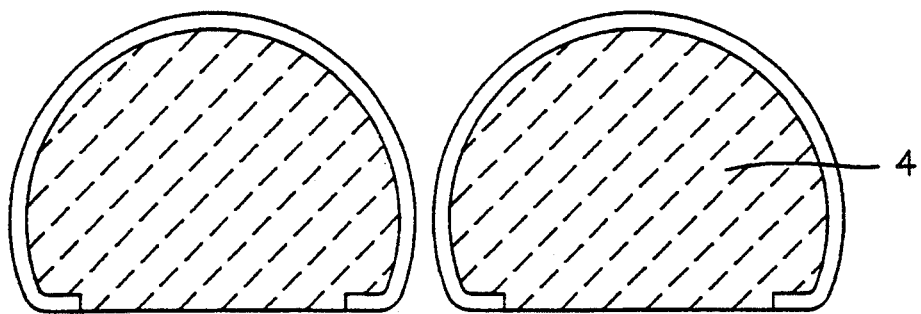
Figure 2B:
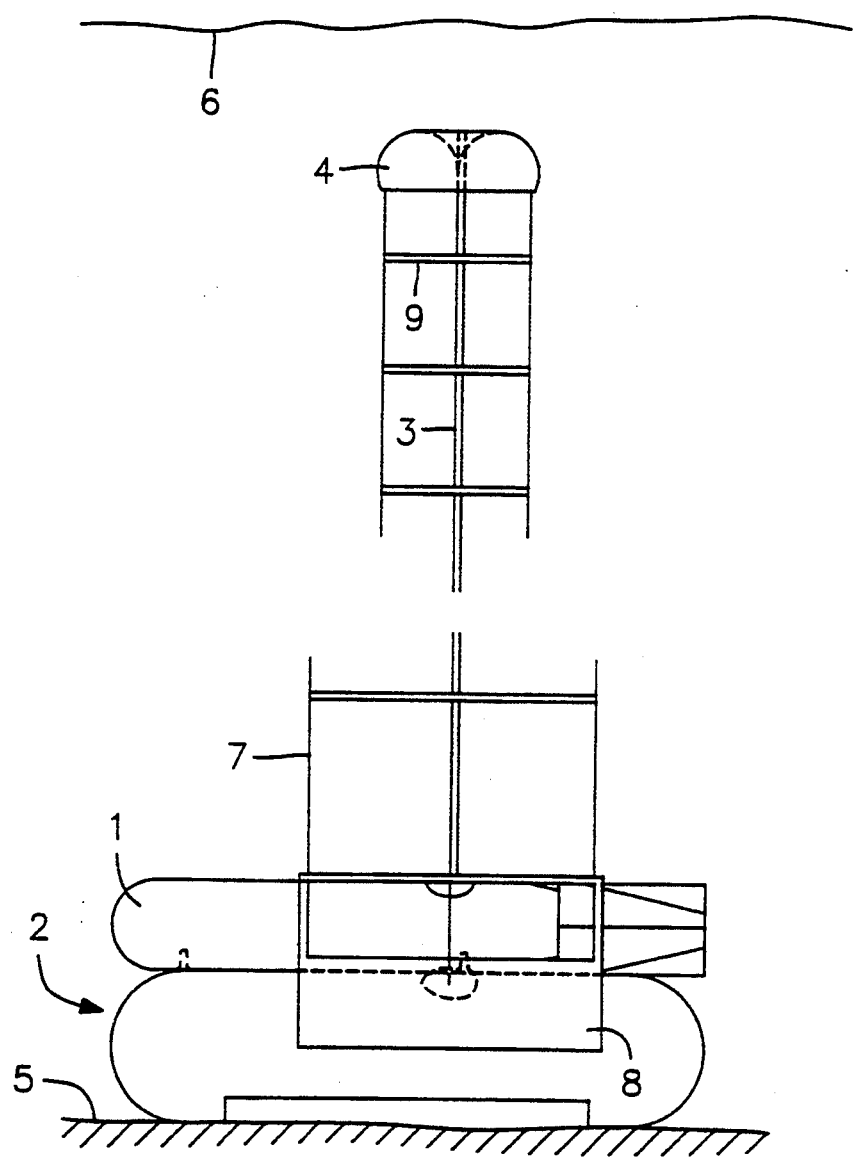
Figure 2C:
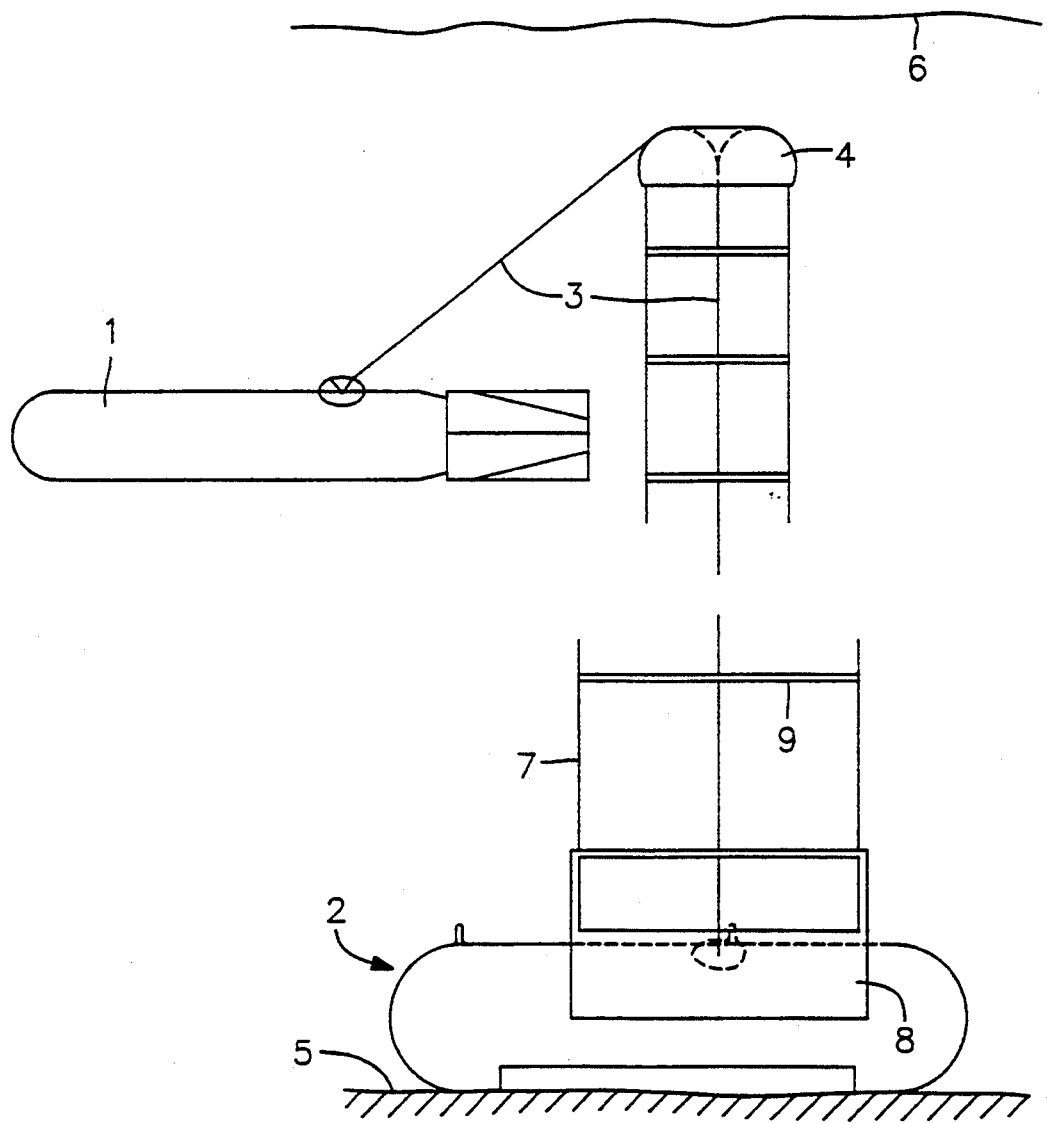

In the following the invention will be described in more detail under reference to the attached drawings where, FIG. 1a–c show an embodiment of the invention in an underwater application from the front, FIG. 2a–c show the corresponding embodiment from the side and FIG. 3 shows a cross section through an embodiment of a device having buoyancy and being part of the invention.

The embodiment that is shown in the figures relates to a reconnaissance and/or weapon system for underwater use and comprises a vehicle 1, in the following in the description of this system called torpedo, and a support 2 for it. The support is connected with an operator site, preferably on the shore, with a wire connection. This wire, which is intended to lie still, preferably has a higher density than that of water, so it lies on the bottom. Further, the support 2 is connected to the torpedo 1 with a wire 3, here called the control wire, which has a density somewhat lower than that of water. The wire will therefore float in the water and does therefore not strive to lie down on the bottom.

In the support 2 and/or the torpedo 1 there are wire magazines from which the wire is fed out, when the torpedo leaves. In order for the wire feeding to work at quick accelerations etc., it is adviceble to have wire magazines both in the support 2 and the torpedo 1. In certain applications it is nevertheless possible, that a wire magazine in one end of the wire is enough. A reconnaissance torpedo travels about for quite a long time, during which the distance to the support is reduced from time to time, moreover it returns at intervals to a rest position on the support. In this case a wire magazine that is able to wind or reel the wire back is needed. Also in the case with a weapon torpedo this can be of interest as the target can make sharp turns etc.

When a lot of wire is fed out, there is a risk that it will get caught by bottom formations at some point, even if it has some buoyancy. It is this the invention overcomes by being provided with a device 4 having buoyancy, in this underwater application in the following called float, connected to the support 2 and being arranged to be able to raise the control wire 3 from the bottom 5 to a position close to the surface 6.

The float 4 consists of a floating body that is attached to one or more lines 7, which are possible to wind on a winding apparatus 8. The winding apparatus can be controlled to unwind and then wind a suitable part of the line or lines 7. The control wire 3 runs from the support 2, through a hole in the float 4 and further to the torpedo 1.

An advantageous design of said line or lines 7 is to make them as two lines, which along their lengths are provided with transversal struts 9. They thereby create a device looking like a rope-ladder. The distance between the struts 9 is suitably shorter than the length of the adjacent struts 9, which will prevent them from getting entangled by one strut being stuck into an adjacent gap.

The "rope-ladder" is suitably designed with gradually shorter struts counted from the support 2 towards the float 4 and thereby it also has a decreasing distance between the struts. The "rope-ladder" hereby becomes more difficult to detect with a hydroacoustical sensor, as the interference between reflexes from the struts is avoided.

In an advantageous design the struts 9 can be made of tubes of fibreglass reinforced plastic. Through the tubes, between the longitudinal lines 7, a nylon line is drawn, which is of the same kind as the one the longitudinal lines are made from. The outer diameter of the struts could for instance be 7 mm and their inner diameter 5 mm.

Below a theoretic calculation of the design of the "rope-ladder" is given. Within brackets concrete figures for an example is provided.

| | | |
|---|---|---|
| The length of the strut at the ramp | $=l_o$ | (1 m) |
| The length of the strut at the float | $=l_N$ | (0,5 m) |
| The number of struts | $=N$ | |
| The quotient between the step height and the adjacent strut | $=k$ | (0,75) |
| The length of the rope-ladder | $L_N$ | |
| The assumed length of the rope-ladder | $=L$ | (40 m) |

Then the following is valid: $l_N = a^N l_o$
which gives $$N = \frac{\ln(l_N/l_o)}{\ln a} \quad (73)$$

where $a = 1 - k\frac{l_o - l_N}{L}$

This gives $$L_N = \frac{1 - a^N}{1 - a} k\, l_o \quad (39.8 \text{ m})$$

In an advantageous design of the invention, the float 4 is a toroid, and the control wire 3 runs through the central hole of the toroid. The toroid consists of a hard and smooth shell, made for instance of plastic, which on the inside is filled up with a pressure resistant floating material, for instance bonocell.

For the power supply there are suitably accumulators in the support 2. These can either be charged via the wire from the operator site or from thermic batteries in the support, which are activated as the need for charging current arises. Also in the torpedo 1 there are accumulatos, that are charged from the support 2, when the torpedo is in its rest position. To activate the torpedo, the float 4 can either at first be released an adapted length by means of the winding apparatus 8 and then the torpedo 1 be released from a locking device, for example in the form of a motor-driven or magneticly driven male contact on the torpedo, which is in contact with a female contact on the support, the contacts are also at the same time used to feed charging current. Then the torpedo is given buoyancy, for instance by employing a water-bag in the torpedo or by activating water-jets in the torpedo directed downwards. Thereafter the propulsion engines are started. Alternatively the torpedo 1 can be released before the float 4 or on the whole at the same time.

If it is a reconnaissance torpedo, which is to be re-used, it must be able to return to its rest position on the support in order i.a. to recharge the accumulators. The torpedo is then guided to a position above the support, after which the float 4 is pulled down by the winding apparatus 8 and the torpedo is made to descend to its rest position. Among other things due to the design of the support, it is possible also in this case to imagine this to happen in optional order or simultaneously. It could be advicable to provide the support 2 with a TV-camera directed upwards in order to monitor the final docking.

As was previously stated, the corresponding technique can, after a certain adjustment, be used also for atmosphere vehicles, such as wire guided helicopters or propelled airships.

Unlike the conditions for underwater vehicles, it is easy to control atmosphere vehicles via radio communication. There are, however, several disadvantages. The control signal can be intercepted by others and also jammed. In the reconnaissance application the most important thing is, however, that transmission of large amounts of information, such as for instance images, in real time requests a very large bandwidth, which in its turn requests a radio-link connection of an extreme character (and cost) and gives problems i.a. with the directing of the antennas. If on the other hand an optical fibre could be used for the transmission, an excellent, jam resistant, wide band connection is achieved. Then, however, a problem is, as mentioned previously, that the fibre can get caught in trees etc., which however, can be remedied by the invention by lifting the control wire 3 by a device 4 having buoyancy, such as a gas balloon. The geometrical design of the lifting device 4 as well as its line arrangement 7 are of the same kind as the one that was previously described in the underwater case.

If the control wire 3 in the underwater case is an optical fibre, it must have a special water-resistant sheath, which will make it thicker. It is, however, easy to give it a density that is somewhat lower than that of water. In the air case the wire 3 can for obvious reasons not be lighter than air, but an optical fibre does not in this case need an advanced sheath and can be made very thin and light, so that the wire tension between the vehicle and the lifting device 4 can keep it up.

Especially in the helicopter case, where the vehicle is heavier than air, one wants to minimize the weight of the vehicle, so in this case one usually also minimize the carried wire magazine. It is probably difficult to be completely without a wire magazine in the helicopters, as otherwise sudden pulls in the wire can tear it in two.

We claim:

1. A method to operate with a wire-guided, in air or water movable vehicle (1) from a support (2), characterized in that the vehicle and/or the support is provided with a wire magazine for a control wire (3), that the support is provided with a device (4) having buoyancy, which is fastened to one or more lines (7), arranged to be able to be wound or unwound by a winding apparatus (8) on the support (2), and having a rest position on or adjacent the support, that the control wire (3) of the vehicle is drawn from the support through a hole in the device (4) having buoyancy, that at the launch of the vehicle (1) the winding apparatus (8) is made to un-wind an adapted length of the line or lines (7), at which the device (4) having buoyancy will rise to the degree the line or lines admit, while the control wire (3) is drawn out of the wire magazine or magazines, and that the vehicle (1) before, after or at the same time as the device having buoyancy is made to leave the support (2) and then during the move will receive guidance information from the support and possibly send back information from a sensor that is installed in the vehicle.

2. A method according to claim 1, characterized in that the vehicle (1) at the return to its rest position, at first is guided to a position above the support (2), after which, in optional order or simultaneously, the device (4) having buoyancy is pulled down by the winding apparatus (8) to its rest position and the vehicle is made to descend to its rest position.

3. Reconnaissance and/or weapon system comprising a wire guided, in air or water movable vehicle (1) and a support (2) for it, characterized in that the vehicle and/or the support has a wire magazine for 2 control wire (3), that the support is provided with a device (4) having buoyancy, which is fastened to one or more lines (7), arranged to be able to be wound or un-wound by a winding apparatus (8) on the support and having a rest position on or adjacent the support (2), that the control wire (3) of the vehicle is drawn from the support through a hole in the device (4) having buoyancy to the vehicle.

4. Reconnaissance and/or weapon system according to claim 3, characterized in that said line or lines (7) are two lines, which are provided with transversal struts (9) along their lengths, in order to create a rope-ladder shaped device, at which the distance between the struts is shorter than the length of the adjacent struts.

5. Reconnaissance and/or weapon system according to claim 4, characterized in that the length of the struts (9) decreases from the support towards the device (4) having buoyancy.

6. Reconnaissance and/or weapon system according to claim 4, characterized in that the struts (9) are made of tubes through which a transversal line between the longitudinal lines (7) runs, which transversal line is of the same material as said longitudinal lines.

7. Reconnaissance and/or weapon system according to claim 3, characterized in that the device (4) having buoyancy is a toroid and the control wire runs through its central hole.

8. Reconnaissance and/or weapon system according to claim 3, characterized in that it is an underwater system, in which the vehicle (1) is a reconnaissance or weapon torpedo and the control wire (3) has a density that is somewhat lower than that of water.

9. Reconnaissance and/or weapon system according to claim 3, characterized in that it is an atmosphere system, in which the vehicle (1) is an airship having a propulsion system.

10. Reconnaissance and/or weapon system according claims 3 characterized in that it is an atmosphere system, in which the vehicle (1) is a remotely controlled helicopter.

* * * * *